Figure 1:
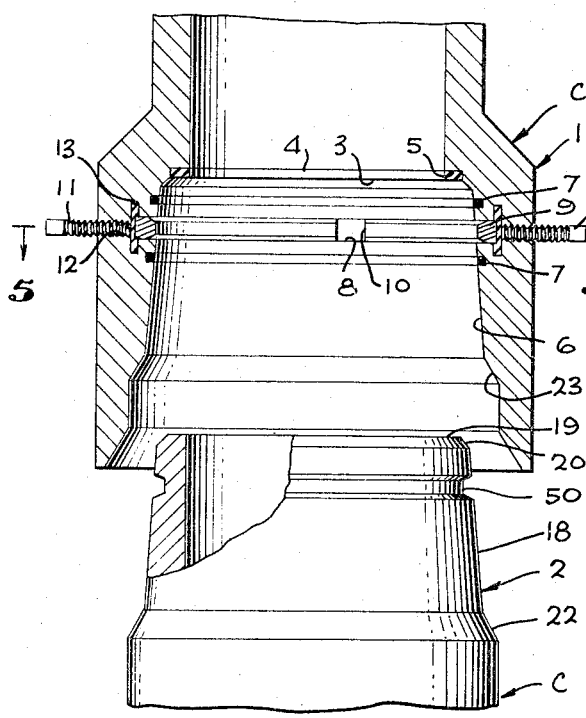

Oct. 3, 1967    J. W. E. HANES ETAL    3,345,087
CONDUIT CONNECTORS

Filed June 18, 1964    2 Sheets-Sheet 1

INVENTORS
JAMES W. E. HANES
WILLIAM F. MILLER
BY
Bernard Kriegel
ATTORNEY

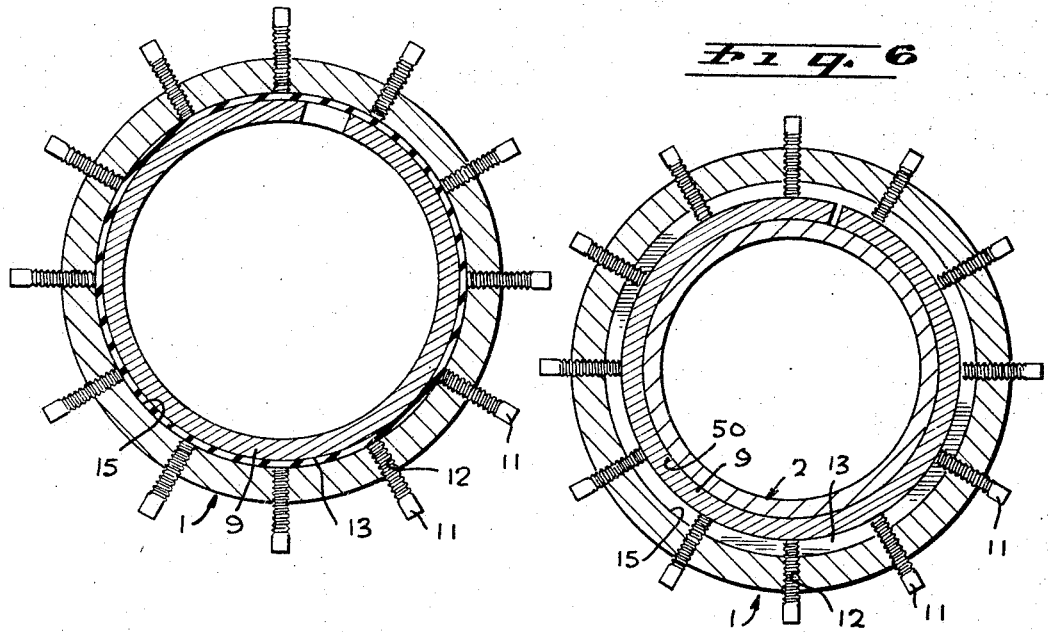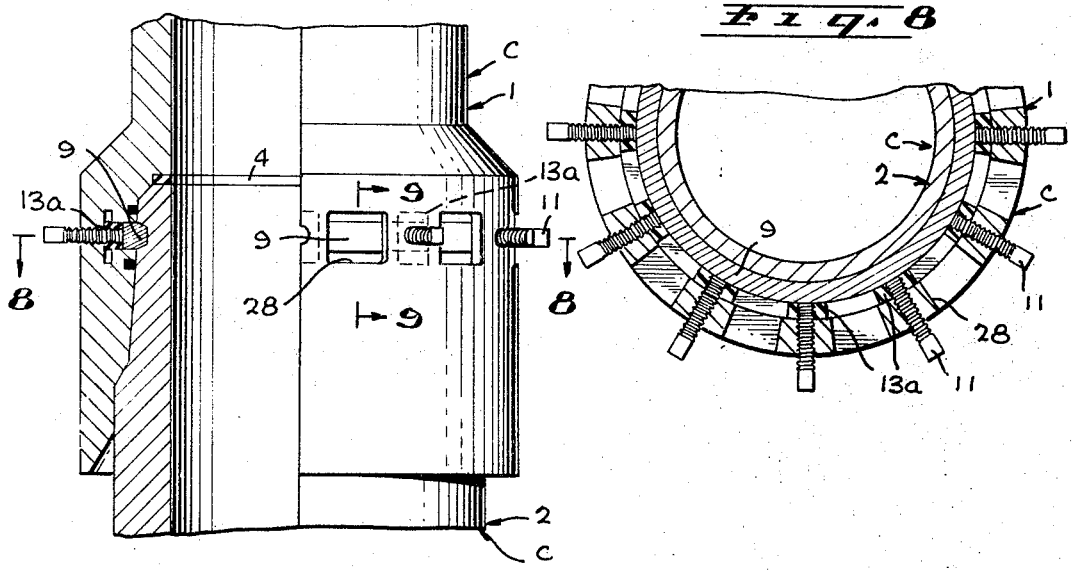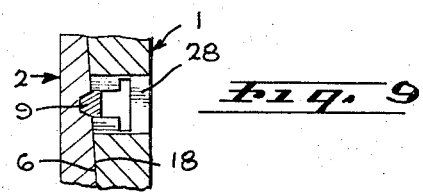

United States Patent Office 3,345,087
Patented Oct. 3, 1967

3,345,087
CONDUIT CONNECTORS
James W. E. Hanes and William F. Miller, Ventura, Calif., assignors, by mesne assignments, to Ventura Company, Ventura, Calif., a corporation of California
Filed June 18, 1964, Ser. No. 376,103
4 Claims. (Cl. 285—39)

The present invention relates to connector means for tubular parts such as, for example, certain tubular parts of well structures, and more particularly, the invention may be advantageously employed in the connection of tubular parts of a well structure located underwater in the drilling and/or completion of offshore oil and/or gas wells.

In the drilling and/or completion of offshore or underwater oil and/or gas wells, particularly in the case of so-called ocean floor completions, it is desirable, if not necessary, that certain connections of tubular parts be made and broken without rotation and with ease, notwithstanding impediments such as ocean currents, surface waves, winds and the like, which may affect the barge or boat from which the drilling, or completion operations are being conducted.

In the present disclosure, the invention is incorporated in a conduit connection which, for example, may be employed in the completion or production of an oil or gas well. More particularly, the invention may be employed in effecting a connection between conduit sections or other components located underwater. The conduit may be made up in sections and extend from the well head to a barge or other vessel at the ocean surface, whereby various operations may be performed through the conduit.

An object of the invention is to provide a connecting means whereby the conduit sections or other components may be connected and disconnected in a simple manner, notwithstanding adverse influence such as wave motion or underwater currents.

Another object of the invention is to provide connecting means for conduit sections or other members which may be connected and disconnected without requiring relative rotation of the members.

Still another object of the invention is to provide such a connecting means which will effect loading of a seal whereby the connection may be maintained pressure tight.

A further object of the invention is to provide connecting means which is especially suited for use in underwater locations and has means for excluding the entry of foreign matter or sedimentation in the latching instrumentalities, thereby assuring ease of disconnection even though the connection may have been submerged for a substantial period of time.

More specifically, an object of the invention is to provide male and female tubular members with connecting means including a latch element adapted to be positively actuated into latching relation with the tubular members and which has a natural tendency to move to an unlatched condition. It is a more specific aspect of this object that the latch element and one of the tubular members have cooperative means for causing a seal to be engaged between the tubular members.

Another object of the invention is to provide connecting means described above wherein the latch element may be visually inspected and fragments may be removed if the latch element should be fractured.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Figure 3:
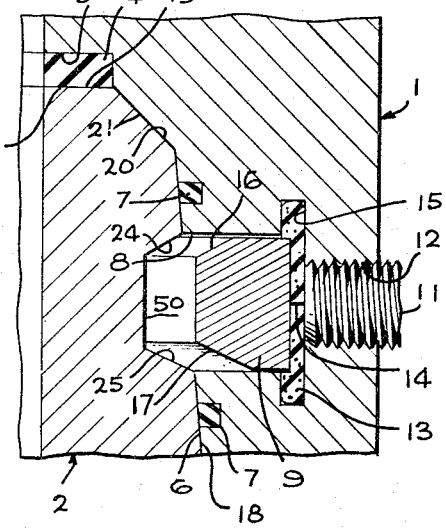
Figure 2:
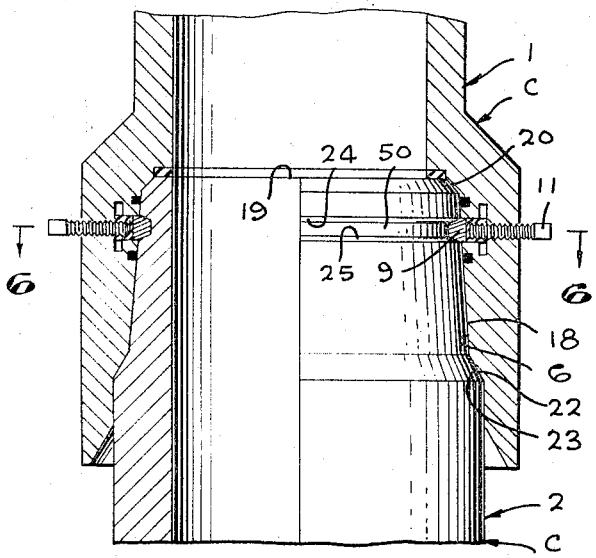
Figure 4:
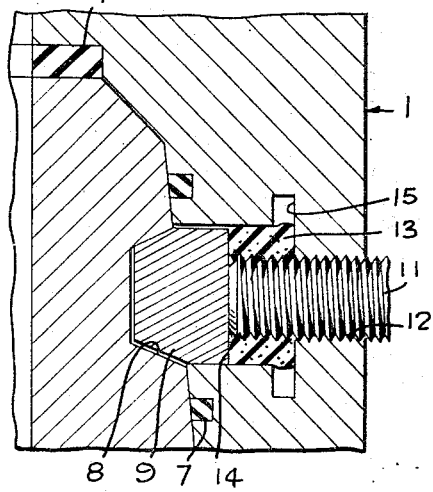

Referring to the drawings:
FIG. 1 is a view in longitudinal section through a pair of members incorporating the connecting means of the invention, the members being unconnected, but aligned for axial movement into position at which they may be latched together;
FIG. 2 is a view in longitudinal section, showing the members of FIG. 1 connected together;
FIG. 3 is a fragmentary sectional view, showing the members engaged but with the latch means released;
FIG. 4 is a fragmentary sectional view similar to FIG. 3, but showing the latch means engaged;
FIG. 5 is a view in transverse section as taken on the line 5—5 of FIG. 1;
FIG. 6 is a view in transverse section as taken on the line 6—6 of FIG. 2;
FIG. 7 is a view partly in elevation and partly in longitudinal section showing a modification of the invention;
FIG. 8 is a fragmentary view in transverse section as taken on the line 8—8 of FIG. 7; and
FIG. 9 is a fragmentary view in longitudinal section as taken on the line 9—9 of FIG. 7.

Referring to FIG. 1, the invention will be seen to include generally a pair of co-engageable tubular members consisting of an outer box or female member 1, and a pin or male member 2, each member being at an end of a conduit or other component C which is to be connected to the other.

The box member 1 is provided internally with a sealing surface 3 formed as a part of a resilient seal ring 4, this ring seating on an annular shoulder 5 in the box. In a gradually flaring internal wall 6 within the box and in axially spaced relation is a pair of resilient seal rings 7, 7. Between the seal rings 7, 7 is an annular groove or channel 8 which contains a latch element in the form of a resilient metal ring 9 which is radially split as at 10 so as to enable substantial circumferential deformation upon the application thereto of radial forces at a plurality of angularly spaced locations.

In the illustrative embodiment, the means for applying such radial forces to the latch ring 9 comprises a suitable number of screws 11 which are threaded in a like number of threaded openings 12 leading through the box member 1 into the channel 8.

As a means for protecting the latch element, channel 8 and the latch actuator screws 11 against sediment, encrustation, or the like, particularly when the connection is to be made underwater, a resilient or rubber-like gasket and seal is provided in the channel 8 between the outer periphery of the latch ring 9 and the base wall of the channel, such gasket being in the form of an annulus 13 having openings 14 through which the inner ends of the screws 11 may pass to engage the latch ring 9, as shown in FIG. 4. This gasket 13 is adapted to be relaxed when the latch ring is forced inward and to be deformed by the ring 9 when the latter assumes its normal or unlatched position. Hence, the box 1 at the base of the channel 8 is undercut to form annular cavities 15 which extend axially beyond the upper and lower walls of the channel 8.

Referring to FIG. 3, the gasket 13 is shown as being plastically deformed into the cavities 15 by the pressure of the latch ring 9, which normally expands circumferentially so as to fit wholly within the channel 8. Also the screws 11 have been withdrawn from the openings 14 in the gasket and such openings are closed. However, upon driving of the screw inwardly to force and contract the latch ring to a smaller size, the gasket 13 will tend to resume its normal form, as will hereinafter more fully appear.

The inner corners of the latch ring 9 are bevelled, as at 16 and 17, to provide camming surfaces for a purpose which will be hereafter more fully explained.

Pin 2 has a tapered wall 18 which corresponds to the inside wall 6 of the box. At its upper extremity, the pin 2 has a surface 19 which is transverse to the connector axis and which is a sealing surface engageable with the seal ring 4 of box 1. The upper edge of the pin is preferably bevelled at 20 in a manner corresponding to an internal conical wall 21 within the box. At the lower end of the tapered pin wall 18 is another bevelled surface 22 which corresponds with an internal conical surface 23 within the box 1.

Spaced axially between the bevelled surfaces 20 and 22, so as to be radially alignable with the latch ring 9 upon engagement of the pin within the box, is an annular latch groove 50 having an upper bevelled wall 24 and a lower bevelled wall 25.

It will now be understood that the pin and box as shown in FIG. 1 may be coengaged as shown in FIG. 3 and, thereafter, driving or inward threading of the screws 11 will cause the ring 9 to be forced radially inward and thereby circumferentially reduced so that it is located partially within the groove 50 to positively and effectively interconnect the conduit sections C, as disclosed in FIG. 4.

As the latch ring 9 moves inward during actuation of the latch means and if the pin 2 is not fully seated in the box 1, the latch ring surface 16 will engage the bevelled surface 24 on the pin to impart an axial force to the parts, thereby causing the end face 3 of the pin to engage and compress the seal ring 4 until either or both of the complemental faces 20, 21 and 22, 23 come into coengagement. The seal rings 7 will also be in sealing engagement with the tapered wall 18.

In addition, as the latch ring 9 is being deformed inwardly, the gasket 13 will be allowed to resume its normal form, flowing out of the cavity 15 into surrounding relation to the screws 11, as seen in FIG. 4.

Referring now to the modified construction of FIGS. 7–9, the pin and box structures are essentially the same as the device described above. However, the means for forming a seal about the screws 11 within the latch ring groove 8 of the box, in the modified form, comprises a pad or individual gasket 13a for each screw. In addition, windows 28 are formed in the wall of the box in the spaces intervening with the screw locations. Through these windows, the condition of the latch ring 9 may be observed, and suitable tools employed to facilitate removal of the ring 9 from the groove 50 in the event of its failure to retract fully therefrom.

From the foregoing, it will now be understood that latching means for the members 1 and 2 have been provided, whereby when the ring 9 is engaged in the groove 24 of the pin, the ring bridges the members and positively interlocks them. Moreover, even should the latch ring break, the portion thereof engaged by the screws will prevent separation of the parts. Outward threading of the screws 11 allows the ring 9 to expand inherently from the groove 50 and uncouple the conduit sections C from one another, allowing their axial separation.

We claim:

1. A connector comprising: a hollow box having internally thereof in axially spaced relation a radially projecting resilient seal member, an annular groove, and a stop shoulder; a split resilient and contractible ring in said groove; a plurality of screw members threaded in said box projecting radially in angularly spaced relation and having inner ends projecting into said groove for engagement with said ring; a pin complemental to said box and having in axially spaced relation a radially projecting face engageable with said seal member, an annular groove for reception of the inner marginal portion of said ring, and a stop shoulder engageable with said stop shoulder in said box, wherein said groove in said box is deeper than the radial thickness of said ring, and including a cavity communicating with said groove, and a body of rubber held by said ring in stressed condition in said cavity, said body of rubber relaxing to fill the space between said ring and the base of the groove upon contraction of said ring and to embrace the respective inner ends of said screws.

2. A connector comprising: a hollow box having internally thereof in axially spaced relation a radially projecting resilient seal member, an annular groove, and a stop shoulder; a split resilient and contractible ring in said groove; a plurality of screw members threaded in said box projecting radially in angularly spaced relation and having inner ends projecting into said groove for engagement with said ring; a pin complemental to said box and having in axially spaced relation a radially projecting face engageable with said seal member, an annular groove for reception of the inner marginal portion of said ring, and a stop shoulder engageable with said stop shoulder in said box, wherein said groove in said box is deeper than the radial thickness of said ring, and including a cavity communicating with said groove, and a body of rubber held by said ring in stressed condition in said cavity, said body of rubber relaxing to fill the space between said ring and the base of the groove upon contraction of said ring and to embrace the respective inner ends of said screws, and wherein said box is provided with circumferentially spaced windows opening in said groove in said box in alternate relation to said screws.

3. A connector comprising: a hollow box open at one end and having internally thereof a circumferential groove between the ends of said box, a split resilient ring disposed in said groove, said resilient ring having a radial thickness less than the radial depth of the box groove, actuator means for forcing said ring inwardly in angularly spaced locations to cause circumferential reduction of said ring, a pin disposable in said box and having a groove for reception of the inner periphery of said ring to interlock said sections together upon circumferential reduction of said ring, a rubber-like filler in said circumferential groove behind said ring, said actuator means comprising a plurality of screws threaded in said box and extending into said groove in contact with said filler, said filler being in the form of a ring and having openings for said respective screws through which said screws extend into engagement with said split ring, said filler, box groove and resilient ring being so constructed and arranged that the volume between the bottom of the box groove and the adjacent surface of the resilient ring is substantialy filled by said filler and screws in the contracted position of said ring and said volume in the expanded position of said ring is substantially filled by said filler.

4. A connector comprising: a hollow box open at one end and having internally thereof a circumferential groove between the ends of said box, a split resilient ring disposed in said groove, said resilient ring having a radial thickness less than the radial depth of the box groove, actuator means for forcing said ring inwardly in angularly spaced locations to cause circumferential reduction of said ring, a pin disposable in said box and having a groove for reception of the inner periphery of said ring to interlock said sections together upon circumferential reduction of said ring, a rubber-like filler in said circumferential groove behind said ring, said actuator means comprising a plurality of screws threaded in said box and extending into said groove in contact with said filler, said filler being in the form of a pad between each screw and said ring, said pad filler, box groove and resilient ring being so constructed and arranged that the pad filler substantially fills the space between the bottom of the groove and the adjacent surface of the ring in the expanded position of said ring and the pad filler and screw substantially fill said space in the contracted position of said ring in the projected area of said pad, and said box having windows opening to said split resilient ring and spaced circumferentially intermediate said pads and screws.

(References on following page)

References Cited

UNITED STATES PATENTS

| | | | |
|---|---|---|---|
| 2,421,105 | 5/1947 | Warren | 264—269 |
| 2,439,306 | 4/1948 | Laidley | 277—166 |
| 2,465,848 | 3/1949 | Collins et al. | 285—96 X |
| 3,100,656 | 8/1963 | MacArthur | 285—55 |
| 3,132,879 | 5/1964 | Lanmon | 285—137 |
| 3,144,262 | 8/1964 | Reynolds | 285—332.2 X |
| 3,151,680 | 10/1964 | Parkhurst et al. | 285—332.3 |
| 3,166,345 | 1/1965 | Pinkard | 285—332.3 |
| 3,222,075 | 12/1965 | Haeber | 285—404 X |
| 3,228,715 | 1/1966 | Neilon et al. | 285—313 |
| 3,273,915 | 9/1966 | Bishop et al. | 285—140 X |

FOREIGN PATENTS

| | | |
|---|---|---|
| 1,305,096 | 4/1962 | France. |
| 1,550 | 10/1877 | Germany. |
| 730,339 | 5/1955 | Great Britain. |

CARL W. TOMLIN, *Primary Examiner.*

D. W. AROLA, T. LISLE, *Assistant Examiners.*